(12) United States Patent
Soepenberg et al.

(10) Patent No.: US 7,711,701 B2
(45) Date of Patent: May 4, 2010

(54) EFFICIENT RECORDING OF OBJECT CAROUSELS

(75) Inventors: Gerrit H. Soepenberg, Eindhoven (NL); Octavius J. Morris, Redhill (GB); Leendert T. Rozendaal, Valkenswaard (NL); Jonathan R. Piesing, Croydon (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 666 days.

(21) Appl. No.: 09/881,599

(22) Filed: Jun. 14, 2001

(65) Prior Publication Data

US 2002/0059645 A1    May 16, 2002

(30) Foreign Application Priority Data

Jun. 30, 2000    (GB) .................................. 0016061.4

(51) Int. Cl.
*G06F 17/30*    (2006.01)
(52) U.S. Cl. ...................................... 707/200
(58) Field of Classification Search ................ 707/200, 707/10, 101, 104.1, 1, 2; 709/224, 249, 202; 725/63, 110, 134, 139, 142, 116; 719/328; 710/306; 375/240.14; 370/394

See application file for complete search history.

(56) References Cited

U.S. PATENT DOCUMENTS

| 5,235,619 A * | 8/1993 | Beyers et al. ............... 375/260 |
| 5,978,855 A * | 11/1999 | Metz et al. .................. 709/249 |
| 6,052,555 A * | 4/2000 | Ferguson .................... 725/116 |
| 6,496,896 B1 * | 12/2002 | Inoue .......................... 710/306 |
| 2001/0022001 A1 * | 9/2001 | Hiroi .......................... 725/110 |
| 2002/0091816 A1 * | 7/2002 | Stalker ....................... 709/224 |
| 2002/0188950 A1 * | 12/2002 | Soloff et al. ................. 725/63 |

FOREIGN PATENT DOCUMENTS

| EP | 0823798 A1 | 8/1997 |
| EP | 0907285 A1 | 10/1997 |
| WO | WO9962248 | 5/1999 |
| WO | WO9965230 | 6/1999 |
| WO | WO9965230 | 12/1999 |

\* cited by examiner

*Primary Examiner*—Etienne P LeRoux

(57) ABSTRACT

A transmission system includes a transmitter (10) and at least one receiver (14) configured to receive signals transmitted therefrom. Carousel-forming data file and directory objects are sent in cycles, with predetermined groups of file and directory objects being formed into respective modules at the transmitter, suitably according to MPEG-2 DSM-CC protocols. Each of the modules is transmitted as a whole, and the receiver is arranged to record received file data and directory objects under a predetermined grouping formulation, at elementary stream or module level.

21 Claims, 2 Drawing Sheets

EFFICIENT RECORDING OF OBJECT CAROUSELS

CROSS REFERENCE TO RELATED APPLICATIONS

The present invention claims priority, under 35 U.S.C. 119(a), to British Patent Application No: 0016062.2, filed Jun. 30, 2000.

BACKGROUND OF THE INVENTION

1. Field of the Invention

The present invention relates to methods and apparatus for the recording of digital broadcast material and in particular to the recording of multimedia applications accompanying television broadcasts.

2. Discussion of Related Art

A broadcaster can broadcast multimedia platform-specific applications possibly together with digital television programs. A suitably equipped multimedia platform-specific set-top box can receive those applications and run them locally. Example applications are electronic program guides, play-along games, Tele-banking, Tele-shopping, electronic newspapers and similar information services. Television programs can be recorded and, if such a television program has an application associated with it, then that application should also be recorded. Typically multimedia platform-specific applications are broadcast in an object carousel, where all the application code and data is broadcast in cycles. This resembles teletext data, which is also broadcast in a carousel.

A suitable transmission system for such application delivery is known from ISO/IEC International Standard 13818-6, "MPEG-2 Digital Storage Media Command and Control" Jul. 12, 1996 (identified herein as DSM-CC). In modern digital broadcast systems a transmitter typically transmits a large number of services (or channels) to a plurality of receivers, examples of which are to be found in television sets or set-top boxes. Such a service can contain an audio/video stream, an interactive application (for example in the MHEG-5 format), other kinds of data or a combination of these elements. An MPEG-2 transport stream is a multiplex of a number of services, and a transmitter will typically transmit several transport streams to the set-top boxes. In turn, a suitably configured set-top box can tune to a specific transport stream and is then able to retrieve information from that transport stream.

As mentioned above, interactive multimedia applications are typically broadcast in a carousel-like fashion with successive data sections being repeated periodically and sequentially in the transport stream. For instance, both DVB and DAVIC have specified DSM-CC object carousels, as mentioned above, for broadcasting interactive applications.

As is described in the commonly-assigned International patent application WO 99/65230, the objects of a DSM-CC object carousel are broadcast in modules and provide a "virtual" file system comprised of file and directory objects in the manner of a personal computer (PC) file system. Such a module is a container of objects and comprises a number of DownloadDataBlock messages (which are specified in the MPEG-2 standard as private sections). When a set-top box wants to pre-fetch a DSM-CC object, it must (amongst other things) know in which module the object resides. After it has retrieved the right module, the set-top box must then parse the module to get to the object itself. Due to the hierarchical nature of the DSM-CC object carousel an object might be included in a subdirectory. If this is the case, the set-top box must also retrieve the module(s) with the intermediate directories, and parse them before it gets to the object in which it is interested.

Typically, the service provider will broadcast the object carousel in a compressed form. This compression is normally done at the module level. Thus, retrieving an object requires also the decompression of all the modules that are needed for the retrieval of the objects the set-top box is interested in. As will be recognised, the hierarchical nature of the DSM-CC object carousel for the purpose of pre-fetching objects requires a lot of processing in the set-top box. Consequently, when considering the issue of recording as an adjunct to capture of digital video broadcasts, it will be recognised that there is a lack of an efficient way to record (and play-back) object carousels.

In such set-ups, the module is the unit of transmission, and it is thus not possible to send a part of a module; either the entire module is sent or nothing is sent. Furthermore, the module is the unit of packaging, with the objects in a module being typically compressed together.

File and directory objects can change over time. In the DSM-CC object carousel, versioning is not done at the (file and directory) object level but at the module level. Only modules have version numbers. Even if only one object in a module changes, the complete module gets a new version number.

Amongst the characteristics of modules and objects is that the grouping of objects in modules does not need to be constant over time. Objects can be moved between modules, and objects can be added and removed.

Since modules are broadcast in MPEG-2 transport streams, and each module is broadcast in the private data sections of an elementary stream, then typically a large number of modules will share the same elementary stream and a complete object carousel will generally be carried on only a limited number of elementary streams (typically fewer than 5).

As will be recognised by the skilled practitioner, the object carousel consists of three layers, wherein the top layer consists of the file and directory objects, the layer below that consists of modules, and the layer below that consists of private data sections in an elementary stream.

SUMMARY OF THE INVENTION

It is accordingly an object of the present invention to facilitate the recording of an multimedia platform-specific application, where it is necessary to record an object carousel (or a part of an object carousel), wherein the recording process can be managed such that the required storage space is minimal and such that the complexity is manageable.

In accordance with the present invention there is provided a transmission system comprising a transmitter and at least one receiver configured to receive signals transmitted therefrom, wherein carousel-forming data file and directory objects are sent in cycles with predetermined groups of file and directory objects being formed into respective modules at the transmitter, with each module being transmitted as a whole, and the receiver being arranged to store received file data and directory objects under a predetermined grouping formulation.

The present invention further provides a transmitter for use in a system as outlined above, said transmitter comprising a connection to a source of data for transmission and data formatting means arranged to assemble into modules for transmission file data and directory objects.

The present invention still further provides a receiver for use in a system as recited above, said receiver comprising means arranged to receive said transmitted modules and to store the file data and directory objects therein according to a predetermined grouping formulation.

In a transmission system, or transmitter or receiver component thereof as recited above, the file and directory modules may be comprised in discrete data portions carried in an elementary data stream, with said predetermined grouping formulation for storage being at the elementary level. Alternately, the file and directory modules may be comprised in discrete data portions carried in an elementary data stream, with said predetermined grouping formulation for storage being at the module level. In either arrangement, the data including file and directory modules may further comprise a version indicator to identify updates, with said modules further comprising discrete data portions carried in an elementary data stream, with said predetermined grouping formulation for storage being at the elementary level.

In a transmission system, or transmitter or receiver component thereof, as described above, the file and directory modules may be linked to time stamp data, with the transmitter being configured to include such time stamp data and the receiver component being arranged to recover such time stamps and utilise them in the reproduction from storage of the carousel. With such a configuration, the reproduction from storage of the carousel is suitably performed at data rates other than that indicated by said time stamps. In one particular application of this latter feature, the reproduction from storage of the carousel is suitably performed at data rates greater than that indicated by said time stamps (i.e. trick modes such as fast forward are accommodated) by reproducing carousel data at a data rate indicated by time stamp data and selectively interposing additional copies of reproduced carousel file and directory objects with said originally reproduced copies.

Further aspects of the present invention are set forth in more detail in the description below, the invention being defined in the attached claims.

BRIEF DESCRIPTION OF THE DRAWINGS

Embodiments of the invention will now be described by way of example only, and with reference to the accompanying drawings in which.

DETAILED DESCRIPTION OF THE PREFERRED EMBODIMENTS

Figure 1:
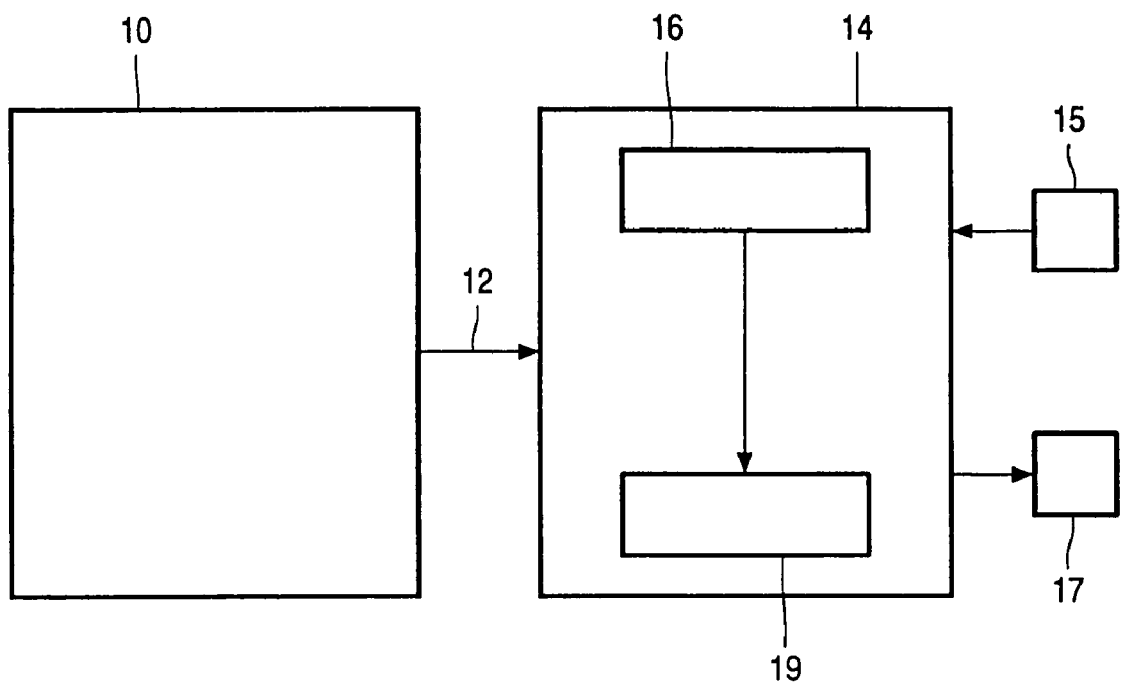
FIG. 1 shows a block diagram of a transmission system suitable to embody the invention.

FIG. 1 shows a block diagram of a transmission system suitable to embody the invention. In such a transmission system a number of multiplex signals 12 are transmitted by a transmitter 10 to a receiver 14. The transmission system may comprise further receivers 14 (not shown), and may, for example, be used in a cable television (CATV) network environment, whereby the transmitter 10 comprises the headend of the CATV-network and the receivers 14 comprise the set-top boxes or the television sets of the end-users. The end-users are able to control a receiver 14 by means of an input device 15, like for instance a keyboard or a remote control. The end-users can view the selected services on a display device 17 which, where the receiver 14 is a television, is integral with 14.

The multiplex signals 12 can be implemented in the form of MPEG-2 transport streams. An MPEG-2 transport stream is a multiplex of a number of so-called services. Such a service can contain an audio/video stream, an interactive application (for example in the MHEG-5 format), other kinds of data or a combination of these elements. Typically, a headend 10 transmits several transport streams 12 to the set-top boxes 14. In this way, a large number of services (or channels) can be broadcast by the headend 10 to a plurality of set-top boxes 14.

A set-top box can 14 tune to a specific transport stream 12 and is then able to retrieve information from the transport stream 12. Such a set-top box 14 typically has only one tuner and is thus merely able to receive a single transport stream 12 at a time. When a user wants to look at a television program, or wants to run an interactive application, or wants to access other kinds of data the set-top box 14 tunes to the corresponding transport stream 12 and retrieves and/or processes the required data from the service as it is being broadcast at that moment.

Interactive applications such as Tele-banking, Tele-shopping or information services are typically broadcast in a carousel-like fashion, i.e. the therewith corresponding data sections are repeated periodically in the transport stream 12. For instance, both DVB and DAVIC have specified DSM-CC object carousels for broadcasting interactive applications.

Figure 2:
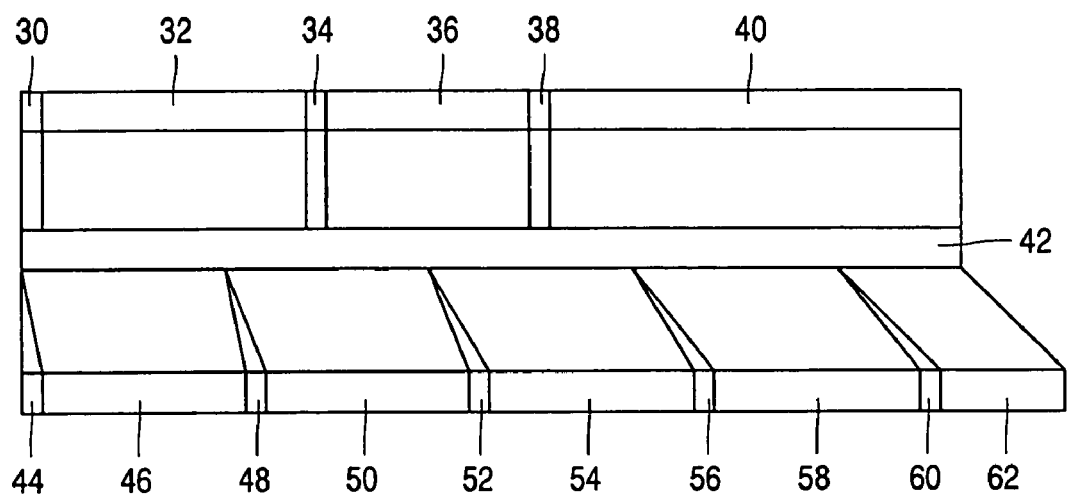
FIG. 2 shows schematically the layering used in DSM-CC object carousels.

In FIG. 2 the layered structure of DSM-CC object carousels is shown. The objects of a DSM-CC object carousel are broadcast in modules. Such a module is a container of objects and comprises a number of DownloadDataBlock messages (which are MPEG-2 private sections). In FIG. 2 module 42 comprises the objects 32, 36 and 40. These objects are included in so-called BIOP-messages. In such a BIOP-message the object is preceded by a message header. In FIG. 2 a first BIOP-message comprises a message header 30 and the object 32, which object 32 may include directory information. A second BIOP-message comprises a message header 34 and the object 36, which object 36 may include stream information. A third BIOP-message comprises a message header 38 and the object 40, which object 40 may include file information.

Furthermore, the module 42 comprises five DownloadDataBlock messages. These DownloadDataBlock messages consist of a header and a data block. The first DownloadDataBlock message is formed by header 44 together with data block 46, the second DownloadDataBlock message is formed by header 48 together with data block 50, the third by header 52 and data block 54, the fourth by header 56 and data block 58, and the fifth by header 60 and data block 62.

Based on the layering of the object carousel, the recording of the object carousel can be done on each of the three layers. Recording at the top layer means that the files and directories of an application are stored in a (regular) file system. This would be a simple solution for object carousels that are static. If however the contents of the object carousel change, then the administration to keep track of file and directory versions becomes extremely complex, because the versioning in the carousel is not done at the file and directory level, but at the module level. An advantage of this solution is that files and directories can be provided to the application on demand without the carousel latency. However, because of the versioning problem, this solution is not preferred.

In one preferred arrangement, the recording of the object carousel is undertaken at the elementary stream level. Recording at the elementary stream level has the advantage that it is generally simple and independent of the specifics of the object carousel. The drawback of this solution is however that of the costs in terms of storage capacity, because each cycle of the carousel is stored over and over again. If much of the carousel content does not change between cycles, then the recording will contain a notable amount of redundancy.

Figure 3:
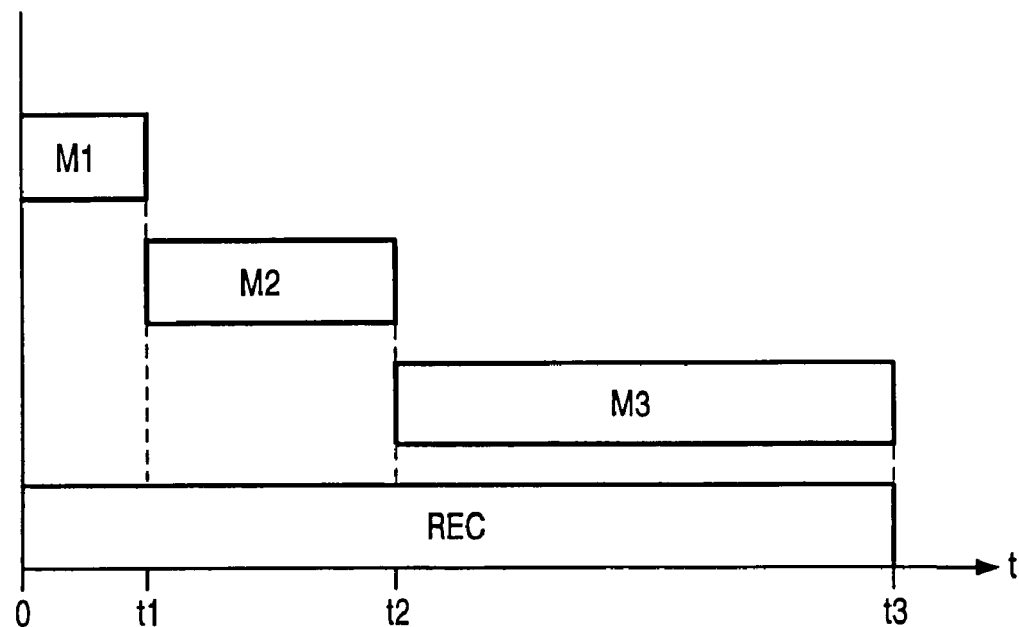
FIG. 3 represents a number of versions of a given module which are respectively valid at different points during playback.

In a further preferred arrangement, the recording of an object carousel is undertaken at the module level. One advantage of this solution is that only one instance of a version of a module can be recorded, which results in a significant reduction of required storage capacity. This ties in to the arrangement described below with reference to FIG. 3 which represents how one specific version of a module is only valid during a specific interval in relation to a recording R. For example, during a recording a module M can have three versions M1, M2, M3. The first version is valid from time=0 (the beginning of the recording) to time t1, the second from t1 to t2 and the third from t2 to t3 (the end of the recording). The recording must store all three versions M1-3 of the module together with an indication for the interval in which they are valid.

The capture and storage of carousel component modules at the elementary stream or module level further assists the efficient play back of an application by providing the modules to the application on demand, especially when the device that contains the recorded modules is a different device from the one that runs or will run the recorded application. That is, the object carousel is not reconstructed during playback (although that certainly is a valid option), but a module is only sent to the multimedia platform-specific device when the multimedia platform-specific device explicitly asks for a module. This has the advantage that the multimedia platform specific device observes a minimal latency when acquiring a module. This typically gives a significant performance improvement compared to a live object carousel broadcast or compared to the situation where the storage device reconstructs the object carousel during play back.

As an example, when the multimedia platform specific device asks the storage device for module X, then the storage device returns that version of module X that is valid for the current time position in the recording.

Providing modules on demand, as described above, requires a special interface between the multimedia platform-specific device and the storage device. The multimedia platform-specific device may not have such an interface and it may only expect a (partial) transport stream input. In that case, the storage device has to reconstruct the object carousel. Because the performance of the application may depend on the order in which the modules are being transmitted, and the broadcaster has probably put the modules in a performance-wise optimal order, it is useful to send out the modules with the same relative timestamps as in the original broadcast. The device supports the recording of the (relative) time stamps of transmission of each module that is part of the recording and the usage of these time stamps in the reconstruction of the object carousel. The time stamps can be stored as a list of tuples (time, module, version). This storage is in addition to the storage of the modules itself (one copy for each version of the module).

Figure 4:
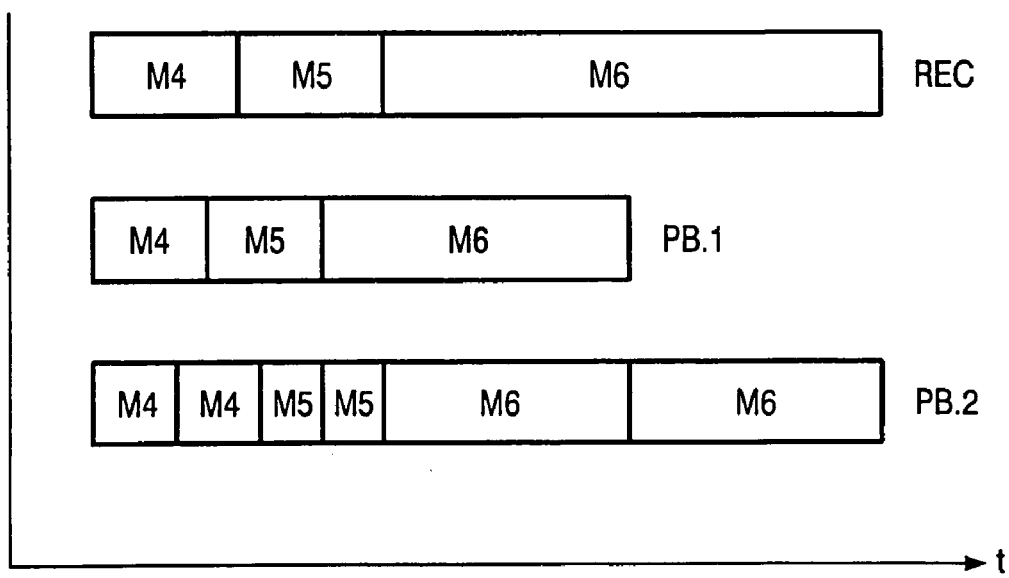
FIG. 4 schematically illustrates two options for increasing bit rates during playback of carousel data.

As a further feature the play-out of a versioned file system (object carousel) may be undertaken at a higher bit rate than originally broadcast. This might be done as schematically represented in FIG. 4 by playing out (middle trace PB.1) the same sequence of modules M4, M5, M6 faster than they were recorded (upper trace REC). Alternately, the bit rate increase may be achieved by keeping the original timing of modules intact and then injecting repetitions of some or all modules in between the play-out of the modules on the original time scheme (lower trace PB.2). Playing out with a higher bit rate will generally be possible, because the available bandwidth from the storage device to the multimedia platform-specific device will tend to be higher than from the broadcaster to the home.

The skilled reader will appreciate that, whilst the foregoing embodiments are described with reference to the MPEG-2 DSM-CC protocol, the invention is not limited to any specific protocol or form of data broadcast.

From reading the present disclosure, other modifications will be apparent to persons skilled in the art. For example, the extraction of a versioned file system from an object carousel (or any other form of data broadcast) may be undertaken as precursor to storing it "out of band". The reasons for this are improved disc usage (less storage space needed) and faster random access. This and other such modifications may involve other features which are already known in the design, manufacture and use of multimedia home platforms and applications and devices for incorporation therein and which may be used instead of or in addition to features already described herein.

What is claimed is:

1. A transmission system comprising a transmitter and at least one receiver configured to receive signals transmitted therefrom, wherein carousel-forming data file and directory objects are sent in cycles with predetermined groups of file and directory objects being formed into respective modules at the transmitter, with each module being transmitted as a whole, and the receiver being arranged to store, for retrieval upon subsequent playback, received file data and directory objects under a predetermined grouping formulation, wherein the file and directory modules are comprised in discrete data portions carried in an elementary data stream, with said predetermined grouping formulation for storage being at the module level further including an indication for the interval in which they are valid, wherein said indication enabling only one instance of a version of a module to be recorded by the receiver.

2. A transmitter for use in a system as claimed in claim 1, said transmitter comprising a connection to a source of data for transmission and data formatting means arranged to assemble into modules for transmission file data and directory objects.

3. A receiver for use in a system as claimed in claim 1, said receiver comprising means arranged to receive said transmitted modules and to store the file data and directory objects therein according to a predetermined grouping formulation.

4. A transmission system according to claim 1, wherein the data including file and directory modules further comprises a version indicator to identify updates, with said modules further comprising discrete data portions carried in an elementary data stream, with said predetermined grouping formulation for storage being at the elementary level.

5. A transmission system according to claim 1, wherein the file and directory modules are linked to time stamp data, with the transmitter being configured to include such time stamp data and the receiver component being arranged to recover such time stamps and utilise them in the reproduction from storage of the carousel.

6. A transmission system according to claim 5, wherein the reproduction from storage of the carousel is performed at data rates other than that indicated by said time stamps.

7. A transmission system according to claim 6, wherein the reproduction from storage of the carousel is performed at data rates greater than that indicated by said time stamps by reproducing carousel data at a data rate indicated by time stamp data and selectively interposing additional copies of reproduced carousel file and directory objects with said originally reproduced copies.

8. A transmitter as claimed in claim 2, said transmitter comprising a connection to a source of data for transmission and data formatting means arranged to assemble into modules for transmission file data and directory objects.

9. A transmitter according to claim 2, wherein the data including file and directory modules further comprises a version indicator to identify updates, with said modules further comprising discrete data portions carried in an elementary data stream, with said predetermined grouping formulation for storage being at the elementary level.

10. A transmitter according to claim 2, wherein the file and directory modules are linked to time stamp data, with the transmitter being configured to include such time stamp data and the receiver component being arranged to recover such time stamps and utilise them in the reproduction from storage of the carousel.

11. A transmitter according to claim 10, wherein the reproduction from storage of the carousel is performed at data rates other than that indicated by said time stamps.

12. A transmitter according to claim 11, wherein the reproduction from storage of the carousel is performed at data rates greater than that indicated by said time stamps by reproducing carousel data at a data rate indicated by time stamp data and selectively interposing additional copies of reproduced carousel file and directory objects with said originally reproduced copies.

13. A receiver according to claim 2, said receiver comprising means arranged to receive said transmitted modules and to store the file data and directory objects therein according to a predetermined grouping formulation.

14. A receiver according to claim 3, wherein the data including file and directory modules further comprises a version indicator to identify updates, with said modules further comprising discrete data portions carried in an elementary data stream, with said predetermined grouping formulation for storage being at the elementary level.

15. A receiver according to claim 3, wherein the file and directory modules are linked to time stamp data, with the transmitter being configured to include such time stamp data and the receiver component being arranged to recover such time stamps and utilise them in the reproduction from storage of the carousel.

16. A receiver according to claim 15, wherein the reproduction from storage of the carousel is performed at data rates other than that indicated by said time stamps.

17. A receiver according to claim 16, wherein the reproduction from storage of the carousel is performed at data rates greater than that indicated by said time stamps by reproducing carousel data at a data rate indicated by time stamp data and selectively interposing additional copies of reproduced carousel file and directory objects with said originally reproduced copies.

18. A transmission system comprising a transmitter and at least one receiver configured to receive signals transmitted therefrom, wherein carousel-forming data file and directory objects are sent in cycles with predetermined groups of file and directory objects being formed into respective modules at the transmitter, with each module being transmitted as a whole, and the receiver being arranged to store, for retrieval upon subsequent playback, received file data and directory objects under a predetermined grouping formulation, wherein the file and directory modules are comprised in discrete data portions carried in an elementary data stream, with said predetermined grouping formulation for storage being at the elementary level further including an indication for the interval in which they are valid, wherein said indication enabling only one instance of a version of a module to be recorded by the receiver.

19. The transmission system of claim 18, wherein, with respect to said predetermined grouping formulation, the elementary level corresponds to the lowest layer of an object carousel, with the top layer consisting of the file and directory objects and the middle layer consisting of modules.

20. A receiver according to claim 18, said receiver comprising means arranged to receive said transmitted modules and to store the file data and directory objects therein according to a predetermined grouping formulation.

21. A transmitter as claimed in claim 18, said transmitter comprising a connection to a source of data for transmission and data formatting means arranged to assemble into modules for transmission file data and directory objects.

\* \* \* \* \*